United States Patent [19]

Dunajtschik

[11] Patent Number: 4,766,839

[45] Date of Patent: Aug. 30, 1988

[54] DRUM WITH SPRAY FITTING FOR THE PRODUCTION OF DRAGEES

[76] Inventor: Rudolf Dunajtschik, Flurstrasse 20, D-8990 Lindau (Bodensee), Fed. Rep. of Germany

[21] Appl. No.: 808,279

[22] Filed: Dec. 12, 1985

[30] Foreign Application Priority Data

Dec. 13, 1984 [DE] Fed. Rep. of Germany ....... 3445515

[51] Int. Cl.⁴ ................................................. B05C 5/00
[52] U.S. Cl. ......................................... 118/19; 118/20; 118/24; 118/303; 118/302
[58] Field of Search ....................... 118/19, 20, 24, 17, 118/418, 303, 302; 68/143, 145; 366/235

[56] References Cited

U.S. PATENT DOCUMENTS

| | | | |
|---|---|---|---|
| 1,897,615 | 2/1933 | Logan | 68/143 |
| 3,451,375 | 6/1969 | Martin | 118/19 |
| 3,739,744 | 6/1973 | Eriksen | 118/20 X |
| 3,834,347 | 9/1974 | Motoyama et al. | 118/19 |
| 3,876,144 | 4/1975 | Madden et al. | 118/302 X |

*Primary Examiner*—John P. McIntosh
*Attorney, Agent, or Firm*—Browdy and Neimark

[57] ABSTRACT

A spray arm (6) is arranged parallel to the axis (2) of a drum with a multi-spray system for the production of dragées, on which a jet arrangement (9)(36) for the spraying of kernels, together with, as necessary a cleaning fixture for cleaning the jet arrangement is provided. So that in one and the same drum, several kernels can be treated with different materials, the drum (1) is divided axially into several separate coating chambers, whereby several parallel partitions, each dividing a section of the drum, extend diametrically from the inner circumference of the drum (1) radially inwards in the direction of the drum axis and in each drum section (10)(11) a separate spray arm section (13)(14) is arranged.

8 Claims, 3 Drawing Sheets

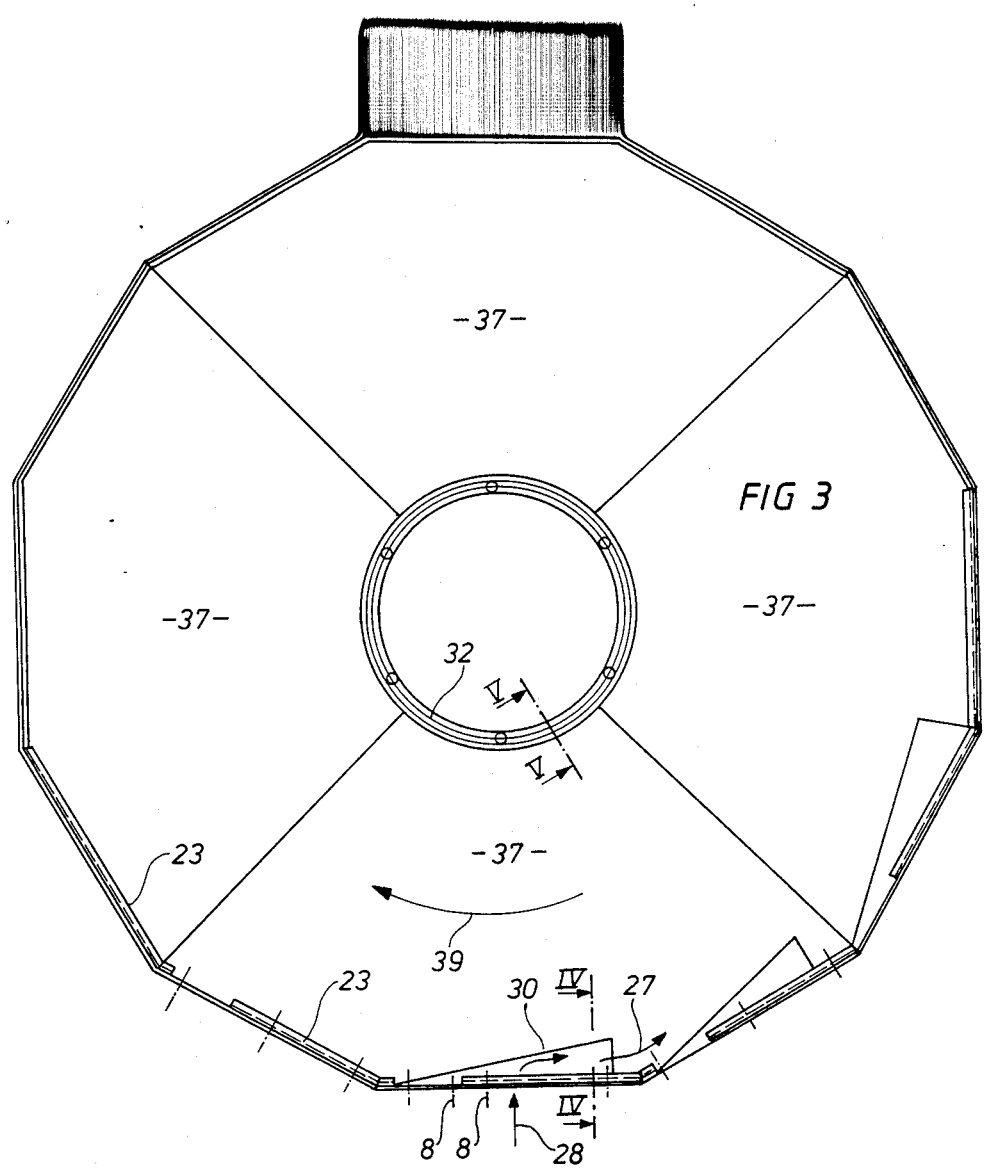

DRUM WITH SPRAY FITTING FOR THE PRODUCTION OF DRAGEES

BACKGROUND OF THE INVENTION

The invention concerns a drum for the production of dragéees. Such a drum is for instance already known under DE-OS No. 33 15 223 from the same applicant. A feature of this known arrangement is that the spray arm is so formed that the cleaning process for the spray jets can be carried out during the short intervals between coatings without interrupting the complete program. To this point this publication explained that the spray arm is fitted in a closed housing in which the spraying and cleaning arrangements are fixed. In the operating mode, the spray arrangement is folded out by specific apertures opened and closed by slides in the housing, thus carrying out the coating of the kernels. In the cleaning mode, the complete jet arrangement in the closed housing is swung in and the recesses in the housing are covered by a covering slide so that the housing is hermetically sealed and the jets are thus now arranged directly opposite the cleaning jets which carry out the cleaning of the spray jets.

This continuous operation of the drum enabling cleaning of the drum during the coating intervals without stopping it has proved itself to be unusually satisfactory. However, with such a known drum only one single load of the same type of kernels can be coated. If differing coatings are required a further drum is required with all fitments for air and water techniques which leads to high equipment resources.

BRIEF SUMMARY OF THE INVENTION

The present invention has as its object the further development of a drum of the type mentioned in the foregoing so that with one and the same drum differing loads of kernels can be coated with different materials.

To solve this problem, the present invention is characterized in that the drum is divided axially into several separate coating chambers (drum sections) for the separate treatment of the kernels, and that several parallel partitions each dividing a section of the drum extend diametrically from the inner circumference of the drum radially inwards in the direction of the drum axis, and that in each drum section a separate spray arm section is arranged.

A fundamental feature of the current invention is therefore that in one and the same drum, various kernels can be simultaneously treated. This is particularly advantageous in the case of kernels which are to be coated in differing colours. Previously, for example, for six different colours six different drums were required with all their necessary attachments such as supply fixtures, air and water fittings, drive, control and the like. In the case of the present invention these resources in materials are rendered superfluous as in this case only one single drum is required, and, naturally the technical air equipment acts simultaneously on all sections of the drum thus producing further savings in resources. A drum according to the invention therefore functions substantially more economically than the currently known drums which require a number of drums for the different treatment of the kernels. Also made similarly redundant are transport problems, material treatment problems, intermediate storage, and cleaning and rinsing problems in that the materials to be treated undergo differing treatments in the area of the different drum sections.

A requirement for such a partitioning of a drum is that one can treat relatively large loads. This is achieved in that the air from the exterior of the drum is blown in radially towards the drum axis and thus the kernels are lifted on an air cushion and essentially do not move, so that even in the case of large load sizes, the kernels will not be damaged.

In the case of the drum divided into sections according to the invention, the air stream in the individual drum sections is so directed that each kernel to be coated is led towards the middle of the drum section so that they do not remain on the partition thus possibly passing through a central aperture in the partition through which the spray arm protrudes, and thus landing in the adjacent section. The annular air flow in each drum section ensures that the spray cloud created in the respective drum sections cannot penetrate into the adjacent section. The air streams in each drum section are so directed that they are always concentrated in the direction of the longitudinal axis, so that a specific screening action in the direction of the partition is available because the partition itself is not acted upon by the air current.

In the following the invention will be further explained by means of drawings illustrating only one application method. Herewith further fundamental features and advantages of the invention arise from the drawings and their descriptions.

Brief description of the various views of the drawings:

FIG. 1: Section through a drum according to the invention.

FIG. 2: Face view of the drum shown in FIG. 1 in the direction of arrow II.

FIG. 3: Front view of the partition shown in FIG. 2.

FIG. 4: Section IV—IV in FIG. 3 through the attachment of the partition.

FIG. 5: Section V—V in FIG. 3

FIG. 6: Schematic perspective illustration of a spray arm divided into sections.

DETAILED DESCRIPTION

Figure 1:
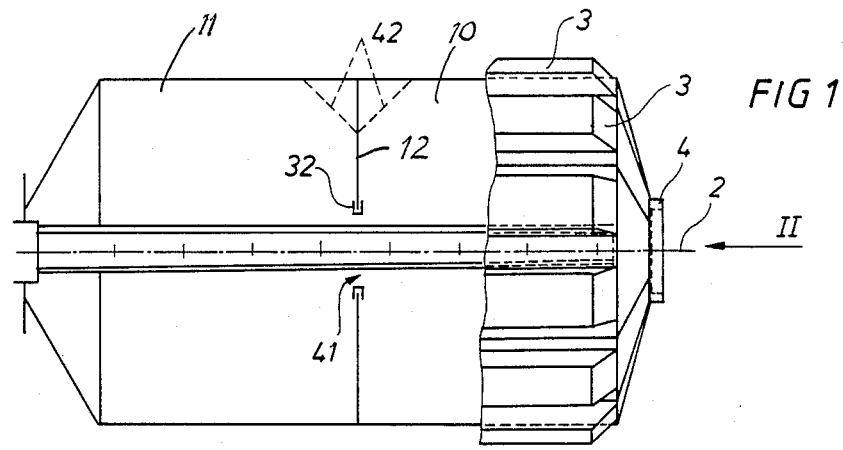

FIG. 1 shows a schematic illustration of a drum (1) whose mountings and external housing have been dispensed with in the interests of clarity. In that matter the specific publication DE-OS No. 33 15 223 is to be referred to, in which it can be seen that the drum (1) is mounted in a machine frame together with the drive system and the complete drum with the drive fittings is enclosed in a (not illustrated) housing.

Figure 2:
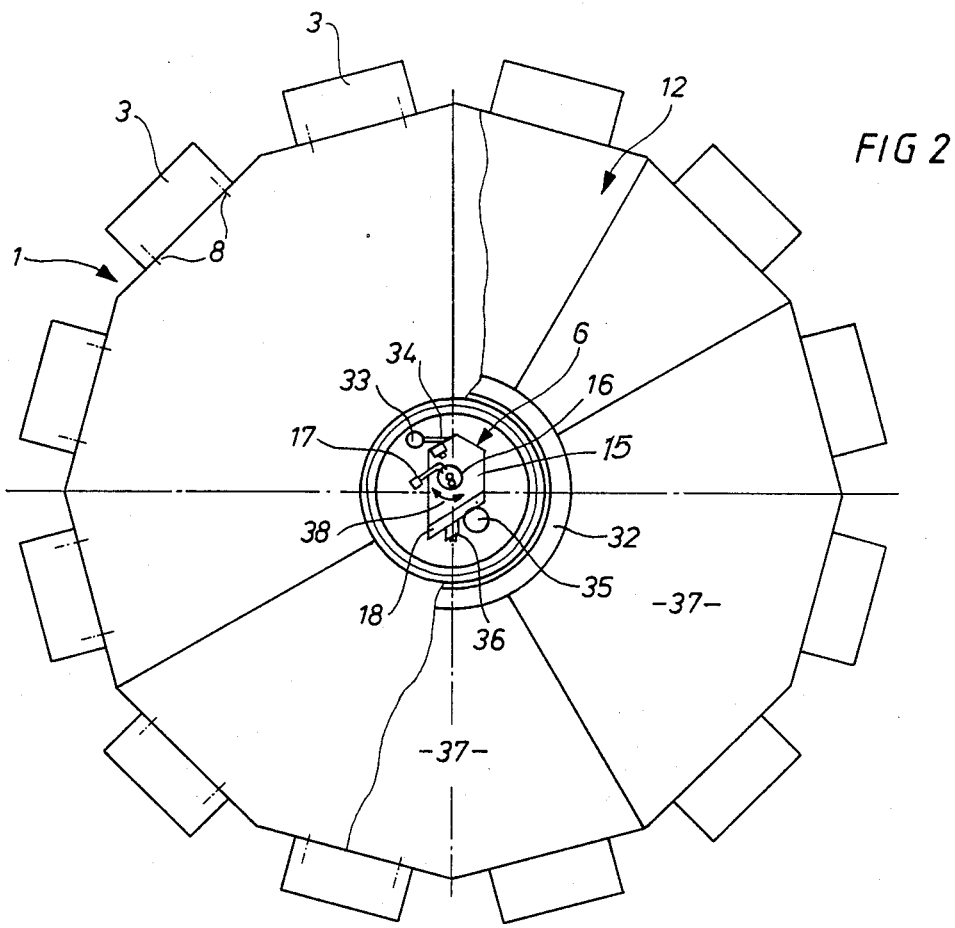

On the face of the drum (1) a flow distributor is fitted from which connection channels (3) extend parallel and equidistant in the direction of the longitudinal axis of the drum (Ref. FIG. 2). The drying air is fed into the connection channels (3) through the flow distributor (4) and reaches the interior of the drum (1) through apertures in the outer wall of the drum (1).

In the embodiment example in accordance with the drawings, the drum (1) is divided into two drum sections (10)(11), in which the division is formed by a partition (12) diametric to the drum axis(2).

A spray arm (6) extends parallel to the drum axis (2) in the direction of the longitudinal axis of the drum (1) which can be seen from the face view of the spray arm in FIG. 2.

Figure 6:
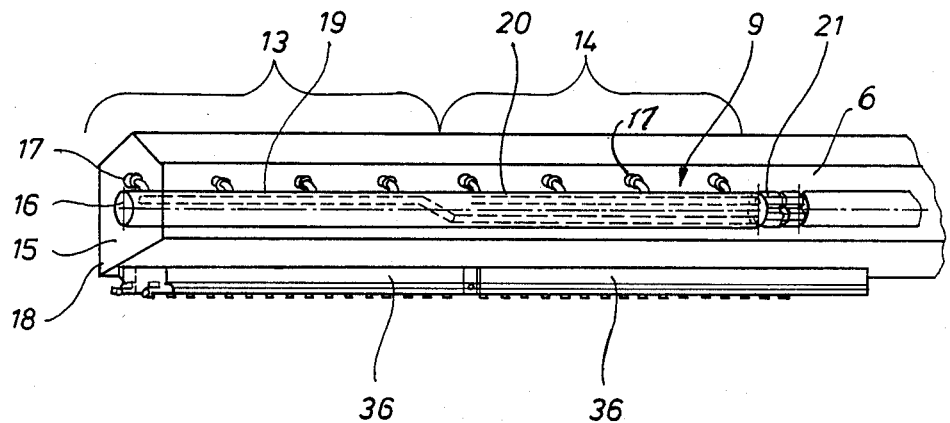

The spray arm (6) in accordance with FIGS. 2 and 6 consists of a closed housing (15) in which a jet carrier (16) extending axially into the housing (15) is available. In the jet (16) two separate jet tubes (19)(20) are arranged which are led off to the exterior of the drum (1) by a connector piece (21). In this fashion it is possible to connect the spray jets (17) of the left hand spray arm section (13) to a different spray medium as that of the spray jets (17) in the right hand spray arm section (14) as shown in FIG. 6.

On the underside of the spray arm (6) are spray jets on bars for chocolate (36) to coat kernels as required with chocolate.

The cleaning fixtures are shown in FIG. 2 only and not in FIG. 6 in the interests of clarity. They consist of a cleaning spray jet bar (34) fitted in the upper inner side of the housing (15) from which a cleaning agent, usually warm water can be directed onto the spray jets (17).

The cleaning of the spray jets (17) during the intervals between coatings is achieved in that the complete jet carrier (16) is swivel mounted in the direction of arrow (38) in the housing (15) and the spray jets (17) in accordance with FIG. 2 are swung clockwise back into the housing (15) so that their openings lie directly opposite to the respective cleaning jets of the cleaning spray jet bar (34).

During the spraying phase the spray jets (17) are swung out of the housing (15) through apertures in this housing taking the position shown schematically in FIG. 2.

During the cleaning phase the spray jets (17) are swung back into the housing by rotating the jet tube (19) in a clockwise direction (arrow direction 38) and the apertures in the housing are sealed by a slide so that the housing is hermetically sealed.

The water sprayed on the spray jets (17) from the cleaning spray jet bar (34) is trapped in a floor channel (18) of the spray arm (6) and directed to the exterior.

For the purposes of powder coatings a powder injection fitting (35) can be provided on the underside of the spray arm (6) whereby, as before, a powder injection fitting for each drum section (10)(11) can be driven separately.

In order that the method of operation may be observed, lighting (33) is fitted on the upper side of the spray arm (6).

The jet arrangement (9) of the spray jets (17) on the common jet carrier (16) in the embodiment example is random. In other, not illustrated, embodiment examples the described cleaning fixture can naturally be dispensed with and the cleaning of the spray jets can be carried out in the usual way.

The important thing is, therefore, that in the drum one or more parallel and equidistant partitions (12) are arranged which, between themselves and as required form, together with the end faces of the drum (1), specific drum sections (10)(11) in each of which is arranged a spray arm section (13)(14) for the separate treatment of kernels to be coated in each respective drum section (10)(11).

Figure 5:
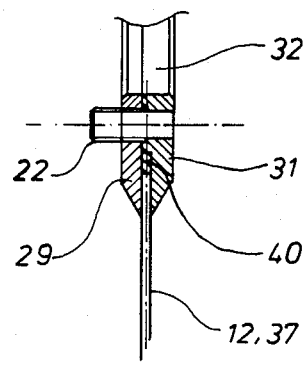

In accordance with FIGS. 2 and 3, the partition (12) consists of several segment shaped partition sections (37) which are held together in a radially inwards position by a U-shaped channel attachment ring (32). In accordance with FIG. 5 the attachment ring (32) consists of two handed ring halves (29)(31) which have their flat sides fitted together, and which have an attachment bolt (22) fitted in one ring half (31) which extends through a corresponding hole in the other ring half (29) where it is secured on this side by a cap nut (not illustrated). Both ring halves (29)(31) form a circular peripheral slot (40) in which is gripped the internal circumference of the respective partition sections (37).

On their longitudinal sides, the partition sections (37) meet tightly together and are connected on their external circumference to the inner side of the drum (1) by means of the attachment shown in FIG. 4.

For this purpose attachment angles (23) are screwed onto the inner side of the drum (1), each attachment angle being connected by a threaded bolt (25) which extends through the wall of the drum (1) and which is secured on the other side by a nut (26).

The legs of the attachment angle (23) standing radially outwards from the inner wall of the drum are tilted towards each other, so that they grip and retain the respective inserted partition sections (37).

At a distance from the wall attachment of the partition sections (37) air guide plates (30) are connected to the partition sections (37) by corresponding attachment angles (24). The attachment angles (24) are welded to the partition section (37) at their points of contact, the other leg of the attachment angle (24) laying flush with the air guide plates (30).

In accordance with FIG. 3 the air guide plates (30) have the task of redirecting in the direction of arrow (27) the air streams entering the drum(1) through the aperture (8) in the direction of arrow (28) to achieve a circular airflow along the inner side of the respective drum sections. This air flow holds the material to be coated away from the drum wall and directs it to the middle of each respective drum section in the direction of the drum axis where it falls back again in the direction of the inner wall of the drum (1). It is important here that the drum rotates in the direction of arrow (39) so that the air flowing in the direction of arrow (27) is able to pick up kernels laying on the floor of the drum and to lead the circulation to the next air guide plate (30).

A partial vacuum is created in each drum section (10)(11) thus avoiding air passing from one drum section (10)(11) to another section (10)(11) through the radial clearance (41) of the attachment ring (32) to the outer circumference of the spray arm.

In a further development of the present invention a wedge-shaped partition profile (42) is provided in place of the straight partition profile (Ref.FIG. 1) as shown by the dotted lines in FIG. 1. The partition in this case extends from the radially inwards situated attachment ring (32) in a radially outwards direction to approximately the middle in a straight form (as in FIG. 1) and then, from the middle, directed radially outwards, to form wedge-shaped radially outwards spreading surfaces.

In this fashion it is ensured that material falling against the partitions is again directed towards the middle of the respective drum sections (10)(11).

What we claim is:

1. A drum for the production of dragees having a coating chamber with a spray arm (6) is arranged to run parallel to the drum axis (2) and on which a jet arrangement (9)(36) to spray the kernels to be coated, together with a cleaning fixture for the cleaning of the jet arrangements (9)(36) is provided, characterized by a drum (1) divided in an axial direction into several, separate coating chambers, drum sections (10) and (11), for the separate treatment of kernels to be coated, several parallel partitions (12) each dividing a section of the drum and extending diametrically from and fixed to the inner circumference of the drum (1) and extending radially inwards in the direction of the drum axis (2), and a separate spray arm section (13)(14) arranged in each drum section.

2. A drum according to claim 1, further characterized by each of the partitions (12) comprising single segment-shaped partition sections (37).

3. A drum according to claim 1 or 2, further characterized by the partition (12) retained by being gripped between opposing attachment angles (23) which are secured to the inner circumference of the drum (1).

4. A drum according to claim 2, characterized by the radial inwards partition sections (37) of the partition mounted on an attachment ring (32) which is arranged at a radial clearance (41) from the external circumference of the spray arm (6).

5. A drum according to claim 1 characterized by each spray arm section (13)(14) co-ordinated with a separate and individually controllable spray arrangement (17,19); (17,20), and that for all spray arm sections (13)(14) a common cleaning fixture, cleaning spray jet bar (34), is provided.

6. A drum according to claim 1, characterized by all drum sections (10)(11) acted upon by a common air supply system comprising several connection channels (3) arranged in parallel and in the axial direction of the drum (1) on its outer periphery.

7. A drum according to one of the claims 1, 2, 4, 5, or 6 characterized by the partition (12) having a wedge-shaped section profile (42).

8. A drum according to claim 5, characterized by the wedge-shaped section profile (42) beginning from approximately the middle of the partition (12) and running, with faces inclined and rising, towards the inner circumference of the drum (1).

* * * * *